(12) United States Patent
Hu

(10) Patent No.: US 11,895,984 B2
(45) Date of Patent: Feb. 13, 2024

(54) PET TRAINING PAD

(71) Applicant: DONGGUAN AMERISON SCIENCE AND TECHNOLOGY CO., LTD., Dongguan (CN)

(72) Inventor: Jiaquan Hu, Dongguan (CN)

( * ) Notice: Subject to any disclaimer, the term of this patent is extended or adjusted under 35 U.S.C. 154(b) by 0 days.

(21) Appl. No.: 17/567,050

(22) Filed: Dec. 31, 2021

(65) Prior Publication Data
US 2023/0210088 A1 Jul. 6, 2023

(51) Int. Cl.
*A01K 15/02* (2006.01)
*A01M 29/24* (2011.01)

(52) U.S. Cl.
CPC .......... *A01K 15/021* (2013.01); *A01M 29/24* (2013.01)

(58) Field of Classification Search
CPC ...... A01K 15/021; A01K 15/02; A01K 3/004; A01M 29/24; A01M 29/00
USPC ........................................... 119/712
See application file for complete search history.

(56) References Cited

U.S. PATENT DOCUMENTS

| | | | | |
|---|---|---|---|---|
| 4,780,706 A * | 10/1988 | Bollag | ................... | G08B 13/10 340/573.3 |
| 4,949,216 A * | 8/1990 | Djukastein | ............... | H05C 1/04 361/232 |
| 4,969,418 A * | 11/1990 | Jones | ...................... | A01K 3/002 119/908 |
| 5,061,918 A * | 10/1991 | Hunter | .................. | A01K 15/021 340/573.2 |
| 5,158,039 A * | 10/1992 | Clark | .................... | A01K 15/029 231/7 |
| 6,016,100 A * | 1/2000 | Boyd | .................. | A01M 31/002 340/573.2 |
| 6,615,770 B2 * | 9/2003 | Patterson | ............. | A01K 15/021 119/719 |
| 6,710,705 B1 * | 3/2004 | Smith | .................. | A01M 31/002 340/384.73 |
| 6,901,883 B2 * | 6/2005 | Gillis | ................... | A01K 15/021 119/719 |

(Continued)

FOREIGN PATENT DOCUMENTS

DE 102009026862 A1 * 12/2010 ........... A01K 15/021

OTHER PUBLICATIONS

Amazon.com SEERWAY Scat Pet Shock Mat Indoor https://www.amazon.com/dp/B09DT4ZNJM/ref=sspa_dk_detail_4?pd_rd_i=B09DT4ZNJM&pd_rd_w=7Mmbr&content-id=amzn1.sym.dd2c6db7-6626-466d-bf04-9570e69a7df0&pf_rd_p=dd2c6db7-6626-466d-bf04-9570e69a7df0&pf_rd_r=GAGKGXD97QWBK6SZ01FD&pd_rd_wg=8b1Et&pd_rd_r=af917e22-6f (Year: 2021).*

(Continued)

*Primary Examiner* — Timothy D Collins
*Assistant Examiner* — Maria E Graber

(57) ABSTRACT

The present invention is a pet training pad comprising a first end of a first conductive wire and a first end of a second conductive wire connected to a main controlling device, while a second end of the first conductive wire and a second end of the second conductive wire remain open. When a pet goes onto the pet training pad, the pet's foot makes contact with the first conductive wire and the second conductive wire at the same time, establishing an electrical circuit via the pet's foot. The main controlling device detects that the electrical circuit and then sends an electric shock current to the first conductive wire, thereby shocking the pet which will guide the pet to form a habit of not going to the position where the pet training pad is located.

15 Claims, 6 Drawing Sheets

(56) References Cited

U.S. PATENT DOCUMENTS

| | | | | |
|---|---|---|---|---|
| 7,770,541 B2* | 8/2010 | Boyd | ................... | A01K 15/021 |
| | | | | 119/719 |
| 7,834,769 B2* | 11/2010 | Hinkle | ................ | A01M 31/002 |
| | | | | 119/908 |
| 10,028,502 B2* | 7/2018 | Nichols | ................. | A01M 29/12 |
| 10,398,138 B2* | 9/2019 | Lampman | .............. | A01K 3/004 |
| 10,849,318 B2* | 12/2020 | Baker | ................. | A01K 87/085 |
| 2002/0092481 A1* | 7/2002 | Spooner | ................ | A01K 3/006 |
| | | | | 119/712 |
| 2005/0257751 A1* | 11/2005 | Jackson | ............ | A61M 5/14228 |
| | | | | 119/651 |
| 2017/0079242 A1* | 3/2017 | Mosley | ................... | G06F 3/165 |
| 2021/0291009 A1* | 9/2021 | Paganini | ............ | A63B 71/0622 |

OTHER PUBLICATIONS

Amazon.com Dog Care Pet Shock Mat Pet Training https://www.amazon.com/Pet-Shock-Mat-Indicator-Intelligent/dp/B077QBQNL1 (Year: 2017).*

* cited by examiner

PET TRAINING PAD

FIELD OF THE INVENTION

The subject matter herein generally relates to pet supplies, and more particularly relates to a pet training pad.

BACKGROUND OF THE INVENTION

As important friends of mankind, pets play an important role in people's daily lives. People are increasingly keen on buying pet supplies for pets. Pet supplies include pet food, pet clothing, pet toys and pet training tools. Among them, pet training tools can be used to train pets and develop good habits for pets, and are therefore especially favored by consumers.

At present, pet training tools include anti-barking devices, anti-barking collars, and the like. Such tools require users to give timely stimulation in response to unwanted pet behaviors, so that pets can connect the unwanted behavior and the stimulation, so as to form good habits. However, such methods require users to continuously pay attention to the behavior of pets and give positive or negative stimulation at an appropriate time, which is a waste of time. Therefore, there is a desire for a pet training pad, which creates a no walking area for pets. When pets pass through the pet training pad, the behavior and stimulation are automatically connected. Pets form a good habit of avoiding the no walking area, and it is not necessary for users to pay attention to the behavior of pets at all times, so as to effectively solve the above-mentioned problems.

SUMMARY OF THE INVENTION

In order to solve the above-mentioned problems, the present disclosure provides a pet training pad, which is convenient for carrying, easy to assemble, and stable in structure.

A pet training pad includes a pad body; a main controlling device; a first conductive wire; and a second conductive wire. The first conductive wire and the second conductive wire are arranged on an upper surface of the pad body. A first end of the first conductive wire and a first end of the second conductive wire are electrically connected to the main controlling device, while a second end of the first conductive wire and a second end of the second conductive wire remain disconnected. The main controlling device is configured to detect whether the second end of the conductive wire and the second end of the second conductive wire are electrically connected and to send an electric shock current to the first conductive wire and/or the second conductive wire when the second end of the conductive wire and the second end of the conductive wire are electrically connected.

In at least one embodiment, the main controlling device includes a detecting unit, a controlling unit, and a shock unit. The detecting unit and the shock unit are electrically connected to the controlling unit. The detecting unit is configured to detect whether the second end of the first conductive wire and the second end of the second conductive wire are electrically connected and to transmit signals to the controlling unit when the second end of the first conductive wire and the second end of the second conductive wire are electrically connected. The controlling unit is configured to control the shock unit to send electric shock current to the first conductive wire and/or the second conductive wire.

In at least one embodiment, the main controlling device further includes a warning unit electrically connected to the controlling unit and configured to output warning signals when the detecting unit detects that the second end of the first conductive wire and the second end of the second conductive wire are electrically connected.

In at least one embodiment, the warning signals includes sound and/or light.

In at least one embodiment, the pet training pad further includes a first switch unit electrically connected to the controlling unit and the shock unit and configured to switch on/off a connection between the controlling unit and the shock unit.

In at least one embodiment, a power module and a second switch unit, wherein the power module and the second switch unit are electrically connected to the controlling unit, and the second switch unit is configured to switch on/off a connection between the controlling unit and the power unit.

In at least one embodiment, the pet training pad further includes a power indicating lamp electrically connected to the power module and the controlling unit and configured to be lighted on when the power module and the controlling unit are electrically connected.

In at least one embodiment, the power indicating lamp is further configured to indicate a remaining capacity of the power module.

In at least one embodiment, the main controlling device further includes a safety switch module electrically connected to the shock unit and configured to detect a duration of the electric shock current and switch off the shock unit if the duration of the electric shock current is greater than a preset duration.

In at least one embodiment, the pad body is made of soft and flexible plastic.

In at least one embodiment, a spacing area is defined between the first conductive wire and the second conductive wire. The width of the spacing area is 3-5 cm.

In at least one embodiment, each of the first conductive wire and the second conductive wire are embedded in the upper surface of the pad body.

In at least one embodiment, the first conductive wire and the second conductive wire extend spirally along the length direction of the upper surface of the pad body.

In at least one embodiment, the first conductive wire and the second conductive wire extend spirally from an edge of the pad body to a center of the pad body.

In at least one embodiment, the upper surface of the pad body is rough.

In at least one embodiment, the lower surface of the pad body is smooth.

In the pet training pad of the present disclosure, the first end of the first conductive wire and the first end of the second conductive wire are connected to the main controlling device, while the second end of the first conductive wire and the second end of the second conductive wire remain open. When a pet goes onto the pet training pad, the pet's foot makes contact with the first conductive wire and the second conductive wire at the same time, and the second end of the first conductive wire and the second end of the second conductive wire are electrically conductive via the pet's foot. The main controlling device detects that the second end of the first conductive wire and the second end of the second conductive wire are electrically conductive and then sends an electric shock current to the first conductive wire. In response, the pet gets an electric shock and then goes away from the pet training pad, which will guide the pet to form a habit of not going to the position where the pet training pad is located. Therefore, it can effectively guide pets to develop good habits by placing the pet training pad at a restricted area, such as near a sofa or trash can, without requiring continuous attention on the pet from the user.

BRIEF DESCRIPTIONS OF THE DRAWINGS

Implementations of the present disclosure will now be described, by way of embodiments, with reference to the attached figures. It should be understood, the drawings are shown for illustrative purpose only.

DETAILED DESCRIPTION OF THE ILLUSTRATED EMBODIMENT

Figure 1:
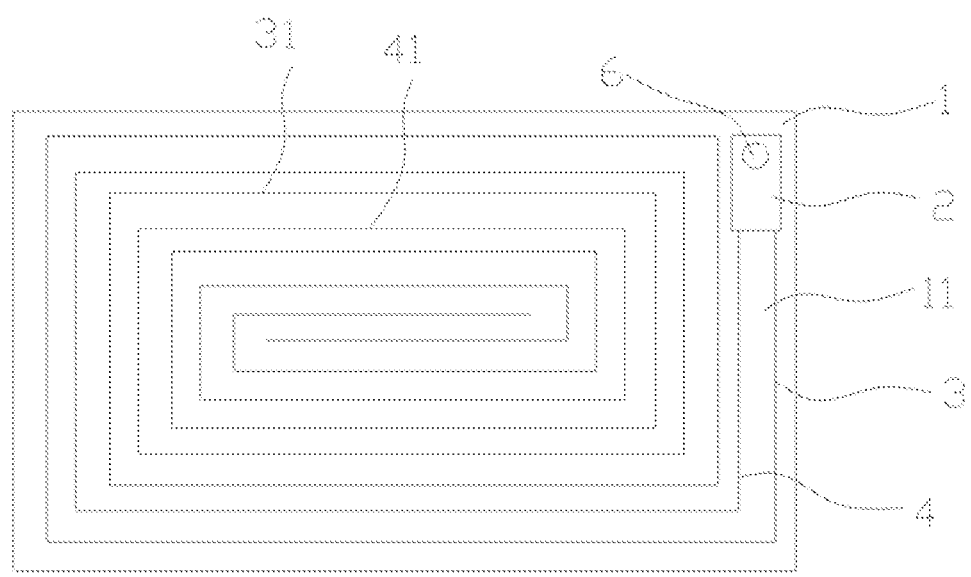
FIG. 1 is a schematic view of a pet training pad according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
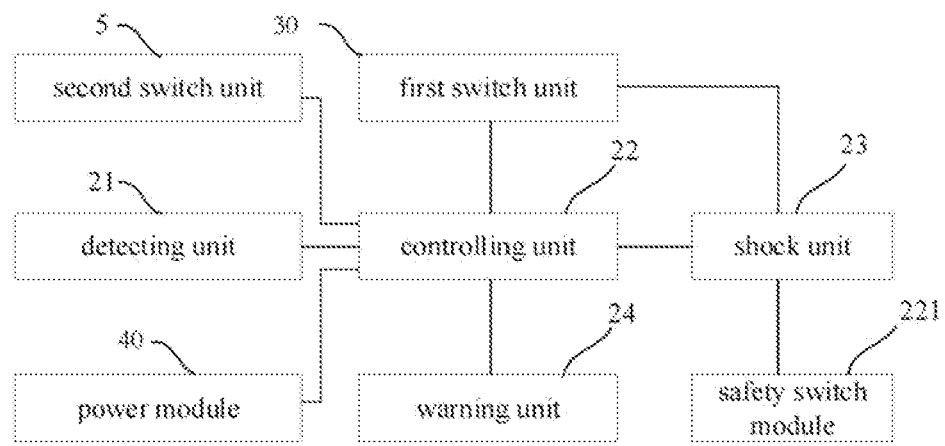
FIG. 2 is a schematic view of a circuit of the pet training pad.
Figure 3:
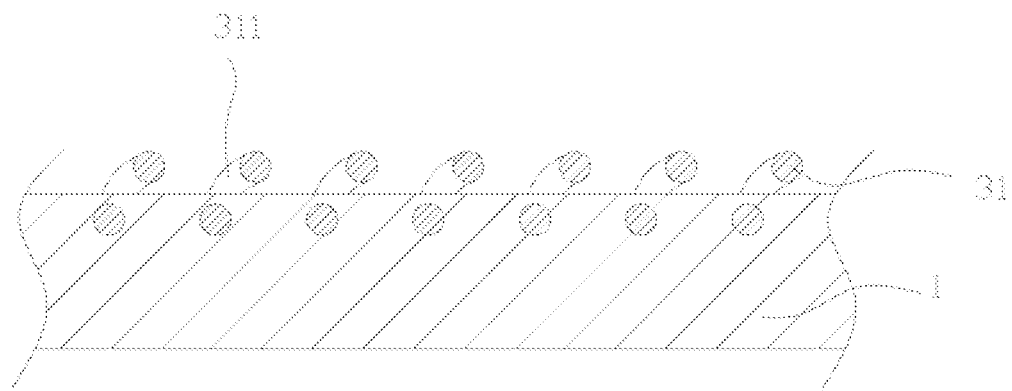
FIG. 3 is a cross-sectional view of a first portion of the pet training pad of FIG. 1 according to an embodiment of the present disclosure.
Figure 4:
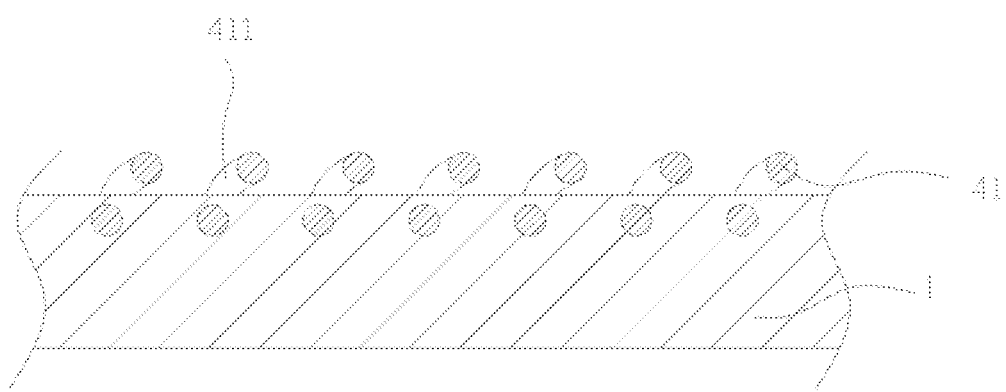
FIG. 4 is a cross-sectional view of a second portion of the pet training pad of FIG. 1 according to an embodiment of the present disclosure.
Figure 5:
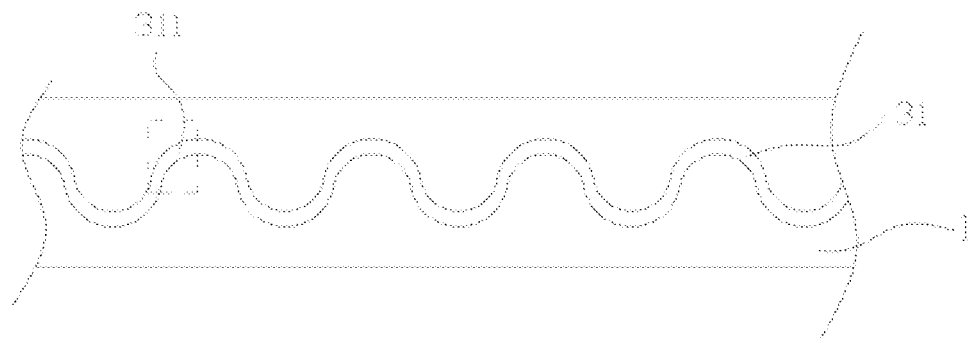
FIG. 5 is schematic view showing a pattern in which the first conductive wire extends according to an embodiment of the present disclosure.
Figure 6:
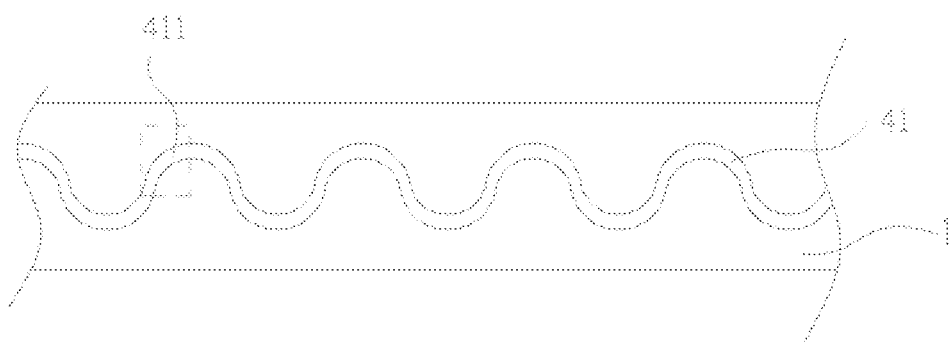
FIG. 6 is schematic view showing a pattern in which the second conductive wire extends according to an embodiment of the present disclosure.

Referring to FIGS. 1-6, a pet training pad includes a pad body 1, a main controlling device 2, a first conductive wire 3 and a second conductive wire 4. A first end of the first conductive wire 3 and a first end of the second conductive wire 4 are connected to the main controlling device 2. A second end of the first conductive wire 3 and a second end of the second conductive wire 4 remain open. The first conductive wire 3 and the second conductive wire 4 are arranged on an upper surface of the pad body 1 at interval. The main controlling device 2 is configured to detect whether the second end of the first conductive wire 3 and the second end of the second conductive wire 4 are electrically conductive. When the main controlling device 2 detects that the second end of the first conductive wire 3 and the second end of the second conductive wire 4 are electrically connected, the main controlling device 2 sends an electric shock current to the first conductive wire 3 and/or the second conductive wire 4.

Through such an arrangement, when in use, the first end of the first conductive wire and the first end of the second conductive wire are connected to the main controlling device, while the second end of the first conductive wire and the second end of the second conductive wire remain open. When a pet goes onto the pet training pad, the pet's foot makes contact with the first conductive wire and the second conductive wire at the same time, while the second end of the first conductive wire and the second end of the second conductive wire are electrically conductive via the pet's foot. The main controlling device detects that the second end of the first conductive wire and the second end of the second conductive wire are electrically conductive and then sends an electric shock current to the first conductive wire. The pet gets an electric shock and then goes away from the pet training pad, which will guide the pet to form a habit of not going to the position where the pet training pad is located. Therefore, it can effectively guide pets to develop good habits by placing the pet training pad at a restricted area, such as near a sofa or trash can, without requiring continuous attention on the pet from the user.

In at least one embodiment, the main controlling device 2 includes a detecting unit 21, a controlling unit 22 and a shock unit 23. The detecting unit 21 and the shock unit 23 are electrically connected to the controlling unit 22. The detecting unit 21 is configured to detect whether the second end of the first conductive wire 3 and the second end of the second conductive wire 4 are electrically conductive. When the detecting unit 21 detects that the second end of the first conductive wire 3 and the second end of the second conductive wire 4 are electrically conductive, the detecting unit 21 transmits signals to the controlling unit 22. The controlling unit 22 is configured to control the shock unit 23 to send an electric shock current to the first conductive wire 3 and/or the second conductive wire 4. Through such an arrangement, the detecting unit can detect whether the second end of the first conductive wire and the second end of the second conductive wire are electrically conductive to determine whether the pet is on the pet training pad and transmit signals to the controlling unit when the pet is on the pet training pad. The detecting unit is individually arranged, which allows detecting whether the pet is on the pet training pad before the pet gets an electric shock and protects the pet from sudden high electric current shock when the pet is on the training pad. Therefore, it can improve safety of the pet training pad. Upon receiving signals from the detecting unit, the controlling unit can select an appropriate electric shock current that does not hurt the pet. The shock unit is individually arranged, which can be controlled to send an electric shock current with different strength according to actual requirements, thereby ensuring safety and stability of the pet training pad.

In at least one embodiment, the main controlling device 2 further includes a warning unit 24 electrically connected to the controlling unit 22 and configured to output warning signals when the detecting unit 21 detects that the second end of the first conductive wire 3 and the second end of the second conductive wire 4 are electrically connected. The warning signals can include sound and/or light. Arrangement of the warning unit not only enables users to know the use state of the pet training pad to determine whether the circuit of the pet training pad is malfunctioning, but also can give synchronous sound stimulation and/or light stimulation along with the electric shock to make the pets create connection between the sound stimulation and/or light stimulation, the electric shock and pet behavior. After that, the sound stimulation and/or light stimulation can guide the pet to go away from the pet training pad even without the electric shock stimulation.

In at least one embodiment, the pet training pad further includes a first switch unit 30 electrically connected to the controlling unit 22 and the shock unit 23 and configured to switch on/off the controlling unit 22 and the shock unit 23. Through such an arrangement, users can switch off the shock unit through the first switch unit, so that users can effectively determine whether the pet training pad works or whether the circuit of the pet training pad is effective through the warning unit. Furthermore, after the connection is made between the sound stimulation and/or light stimulation, the electric shock and the pet's behavior, the shock unit can be switch off and the warning unit can output warning of sound stimulation and/or light stimulation to regulate pet's behavior to develop good habits.

In at least one embodiment, the pet training pad further includes a power module 40 and a second switch unit 5 electrically connected to the controlling unit 22 and configured to switch on/off a connection between the controlling unit 22 and the power module 40. Through such an arrangement, users can switch off the circuit of the pet training pad via the second switch unit 5. When users replace the power module 40, switching off the circuit of the pet training pad can prevent the pet training pad from being damaged due to sudden disconnection between the power module and other electrical components, which can effectively prolong service life of the pet training pad and improve user experience. In addition, when users put away the pet training pad, switching off the circuit of the pet training pad can prevent the users from electric shock due to contact the first conductive wire and the second conductive wire simultaneously, which can improve safety of the pet training pad. Furthermore, when there is no need to use the pet training pad, switching off the circuit of the pet training pad can effectively protect the pet training pad to further prolong the service life of the pet training pad.

In at least one embodiment, the pet training pad further includes a power indicating lamp 6 electrically connected to the power module 40 and the controlling unit 22 and configured to be illuminated when the power module 40 and the controlling unit 22 are electrically connected. Through such an arrangement, the power indicating lamp 6 can effectively reflect whether the power module and the controlling unit are electrically connected, which allows users to directly understand the use state of the pet training pad. In at least one embodiment, the power indicating lamp can indicate the remaining capacity of the power module, which can guide the users to replace the power module timely so as to ensure continuous work of the pet training pad, thus ensuring continuously regulating the pet's behavior to develop good habits.

In at least one embodiment, the main controlling device 2 further includes a safety switch module 221 electrically connected to the shock unit 23 and configured to detect a duration of electric shock current sent by the shock unit 23. When the duration of the electric shock current sent by the shock unit 23 is greater than a preset duration, the safety switch module 221 will switch off the shock unit 23. Through such an arrangement, the safety switch unit 221 can control the duration of the electric shock current, which protect the pet from being hurt due to long time shock. It can ensure the pet's safety, and the user does not have to worry about the safety of the pets, and the user experience is thus improved. In addition, controlling the duration of the electric shock current can effectively slow down power consumption, which effectively improves endurance of the pet training pad, thus improving the user experience. Preferably, the preset duration can be set to 15 s, which not only is enough for the pets to create connection between the pet's behavior and the shock stimulation and to develop good habits, but also can ensure the pets' safety to prevent the pets from being hurt due to electric shock.

In at least one embodiment, the pad body 1 is made of soft and flexible plastic. Through such arrangements, the soft and flexible plastic has good flexibility, insulation, water resistance and corrosion resistance. Good flexibility allows the product to be crimped and is convenient for users to take and carry, thus improving the user experience. Good insulation makes the first conductive wire and the second conductive wire on the pad body isolated from each other to form an open circuit, which can achieve detection, electric shock and warn pets. Finally, good water resistance and corrosion resistance can effectively prolong the service life of the pet training pad, thus improving user experience.

In the embodiments, a spacing area 11 is defined between adjacent first conductive wire 3 and second conductive wire 4. A width of the spacing area 11 is 3-5 cm. Through such arrangements, the spacing area with the width of 3-5 cm matches most of pets' feet, which not only can be used to effectively detect whether the pets are on the pet training pad, but also saves wire material, thus reducing cost.

In at least one embodiment, the first conductive wire 3 and the second conductive wire 4 are embedded into the upper surface of the pad body 1 in a spiral pattern along its length direction. Such an arrangement increases contact area of the first and second conductive wires with the pad body, therefore, attaching the first conductive wire and the second conductive wire firmly onto the pad body. The spiral pattern increases the area of the first conductive wire and the second conductive wire exposed to the pad body, which makes it easier to detect whether the pets go onto are on the pet training pad.

In at least one embodiment, the upper surface of the pad body 1 is rough. Such an arrangement prevents the pets from slipping off, thus improving the user experience. Furthermore, a rough surface can increase friction between the first conductive wire and the second conductive wire and the upper surface of the pad body, which improves stability of the pet training pad and prolong service life of the pet training pad.

In at least one embodiment, the lower surface of the pad body is smooth. A smooth lower surface can facilitate the pad body to be attached to the ground or other surface, which helps to keep the pad body in place, improve stability of the pet training pad, and improve the user experience.

In at least one embodiment, the first conductive wire 3 and the second conductive wire 4 extend spirally to the center of the pad body 1 from an edge of the pad body 1. Therefore, the first conductive wire 3 and the second conductive wire 4 cover the whole upper surface of the pad body at equal intervals from the outer edge to the center of the pad body. Such an arrangement is convenient for the detection of the whole pad body and effectively prevents pets from going onto the pet training pad to develop good habits.

As shown in FIGS. 3-6, The first conductive wire 3 and the second wire 4 are in a spiral formation from the centre region to an edge region of the pad body 1. The first wire 3 includes a plurality of first spiral-shaped parts 31, and the second wire 4 includes a plurality of second spiral-shaped parts 41. The first spiral-shaped parts 31 and the second spiral-shaped parts 41 are set in the alternate on the pad body 1. Each first spiral-shaped part 31 includes a plurality of first portions 311 connected to each other in series. A first end of the first portion 311 is disposed on an upper surface of the pad body 1, and a second end of the first portion 311 is placed into the pad body 1 and under the upper surface of the pad body 1. Each second spiral-shaped part 41 is spiral-shaped and includes a plurality of second portions 411 connected to each other in series. A first end of the second portion 411 is disposed on the upper surface of the pad body 1, and a second end of the second portion 411 is placed into the pad body 1 and under the upper surface of the pad body 1. The first portions 311 and the second portions 411 are arc-shaped. Two first ends of the adjacent two first portions 311 are connected to each other, and two second ends of the adjacent two first portions 311 are connected to each other. Two first ends of the adjacent two second portions 411 are connected to each other, and two second ends of the adjacent two second portions 411 are connected to each other.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A pet training pad, comprising:
   a pad body;
   a main controlling device;
   a first conductive wire; and
   a second conductive wire;
   wherein the first conductive wire and the second conductive wire are arranged on an upper surface of the pad body, a first end of the first conductive wire and a first end of the second conductive wire are electrically connected to the main controlling device, a second end of the first conductive wire and a second end of the second conductive wire remain disconnected, the main controlling device is configured to detect whether the second end of the first conductive wire and the second end of the second conductive wire are electrically connected and to send an electric shock current to the first conductive wire and/or the second conductive wire when the second end of the first conductive wire and the second end of the second conductive wire are electrically connected;
   further wherein the second end of the first conductive wire and the second end of the second conductive wire are located at a centre region of the pad body, the first conductive wire and the second conductive wire are in a spiral formation from the centre region to an edge region of the pad body, the first wire comprises a plurality of first spiral-shaped parts, the second wire comprises a plurality of second spiral-shaped parts, and the first spiral-shaped parts and the second spiral-shaped parts are alternatively set on the pad body;
   wherein each first spiral-shaped part comprises a plurality of first portions connected to each other in series, a first end of the first portion is disposed on an upper surface of the pad body, a second end of the first portion is placed into the pad body and under the upper surface of the pad body;
   wherein each second spiral-shaped part comprises a plurality of second portions connected to each other in series, a first end of the second portion is disposed on the upper surface of the pad body, and a second end of the second portion is placed into the pad body and under the upper surface of the pad body.

2. The pet training pad according to claim 1, wherein a spacing area is defined between the first conductive wire and the second conductive wire, and a width of the spacing area is 3-5 cm.

3. The pet training pad according to claim 1, wherein the first conductive wire and the second conductive wire are embedded in the upper surface of the pad body.

4. The pet training pad according to claim 1, wherein the first portions and the second portions are arc-shaped, two first ends of the adjacent two first portions are connected to each other, two second ends of the adjacent two first portions are connected to each other, two first ends of the adjacent two second portions are connected to each other, and two second ends of the adjacent two second portions are connected to each other.

5. The pet training pad according to claim 1, wherein the first conductive wire and the second conductive wire extend spirally along a length direction of the upper surface of the pad body.

6. The pet training pad according to claim 5, wherein the first conductive wire and the second conductive wire extend spirally from an edge of the pad body to a center of the pad body.

7. The pet training pad according to claim 1, wherein the main controlling device comprises a detecting unit, a controlling unit, and a shock unit, wherein the detecting unit and the shock unit are electrically connected to the controlling unit, the detecting unit is configured to detect whether the second end of the first conductive wire and the second end of the second conductive wire are electrically connected and to transmit a signal to the controlling unit when the second end of the first conductive wire and the second end of the second conductive wire are electrically connected, and the controlling unit is configured to control the shock unit to send the electric shock current to the first conductive wire and/or the second conductive wire.

8. The pet training pad according to claim 7, wherein the main controlling device further comprises a warning unit electrically connected to the controlling unit and configured to output a warning signal when the detecting unit detects that the second end of the first conductive wire and the second end of the second conductive wire are electrically connected.

9. The pet training pad according to claim 8, wherein the warning signal comprises sound and/or light.

10. The pet training pad according to claim 7, further comprising a first switch unit electrically connected to the controlling unit and the shock unit and configured to switch a connection between the controlling unit and the shock unit on and off.

11. The pet training pad according to claim 7, further comprising a power module and a second switch unit, wherein the power module and the second switch unit are electrically connected to the controlling unit, and the second switch unit is configured to switch a connection between the controlling unit and the power unit on and off.

12. The pet training pad according to claim 11, further comprising a power indicating lamp electrically connected to the power module and the controlling unit and configured to be illuminated when the power module and the controlling unit are electrically connected.

13. The pet training pad according to claim 12, wherein the power indicating lamp is further configured to indicate a remaining capacity of the power module.

14. The pet training pad according to claim 7, wherein the main controlling device further comprises a safety switch module electrically connected to the shock unit and configured to detect a duration of the electric shock current and switch off the shock unit if the duration of the electric shock current is greater than a preset duration.

15. The pet training pad according to claim 14, wherein the preset duration is 15 seconds.

\* \* \* \* \*